US00RE38301E

(19) United States
(12) Reissued Patent
Bleakley et al.

(10) Patent Number: US RE38,301 E
(45) Date of Reissued Patent: Nov. 11, 2003

(54) PAPER COATING PIGMENTS, THEIR PRODUCTION AND USE

(75) Inventors: Ian Stuart Bleakley, St. Austell (GB); Philip Martin McGenity, Holmfirth (GB); Christopher Nutbeem, St. Austell (GB)

(73) Assignee: Imerys Minerals Limited (GB)

(21) Appl. No.: 09/711,828

(22) Filed: Nov. 13, 2000

Related U.S. Patent Documents

Reissue of:
(64) Patent No.: 5,833,747
Issued: Nov. 10, 1998
Appl. No.: 08/728,518
Filed: Oct. 9, 1996

(30) Foreign Application Priority Data

Oct. 10, 1995 (GB) ..... 9520703

(51) Int. Cl.[7] ..... C09C 1/02
(52) U.S. Cl. ..... 106/464; 106/465; 423/432
(58) Field of Search ..... 106/464, 465; 423/430, 431, 432

(56) References Cited

U.S. PATENT DOCUMENTS

| | | | | |
|---|---|---|---|---|
| 1,872,891 A | | 8/1932 | Church et al. | |
| 3,347,624 A | | 10/1967 | Taylor | |
| 3,920,800 A | | 11/1975 | Harris | |
| 3,989,195 A | | 11/1976 | Falcon-Steward | |
| 4,732,748 A | | 3/1988 | Stewart et al. | |
| 5,215,734 A | * | 6/1993 | Kunesh et al. | 423/430 |
| 5,342,600 A | | 8/1994 | Bleakley et al. | |
| 5,376,343 A | | 12/1994 | Fouche | |
| 5,484,200 A | | 1/1996 | Bradshaw | |
| 5,558,850 A | | 9/1996 | Bleakley et al. | |

FOREIGN PATENT DOCUMENTS

| | | |
|---|---|---|
| EP | 05 58 275 A1 | 9/1993 |
| GB | 1 240 465 | 7/1971 |
| GB | 2 275 876 | 9/1994 |
| JP | 6048732 | 2/1994 |

OTHER PUBLICATIONS

Norwegian Search Report, dated Feb. 6, 2002.
WPI Abstract Accession No. 95–299360/39 JP7196317 A (Ind. Sci & Tech) Dec. 28, 1993.
WPI Abstract Accession No. 92–395143/48—Mar. 22, 1991 JP 4 295010 A (Okutama).
WPI Acc. No. 89–351298/48 JP1261225A (Maruo Calcium KK) Apr. 12, 1998.
WPI Abstract Accession No. 88–075176/11 JP 630303 16A (Ind. Sci & Tech) Jul. 23, 1986.
J.N. Ishley, E.J. Osterhuber & N. Roman, 1992 TAPPI Coating Conference Proceedings, 335–348 (1992)—No Month.
D.B. Crawshaw, C.H. Kahn–Schneider & P.C. Clark, 1982 TAPPI Coating Conference Proceedings, 143–164 (1982)—No month.
G. Engstrom & M. Rigdahl, Nordic Pulp & Paper Research Journal. 90–101 (1992)—No Month.
G. E. Lauterbauch, Wm. F. Parker, M.S. Crill and D.L. Breen, Energy Conservation In Dispersing Calcium Carbonate Pigments, TAPPI Conference, 1977—No Month.

* cited by examiner

*Primary Examiner*—Michael Marcheschi
(74) *Attorney, Agent, or Firm*—Finnegan, Henderson, Farabow, Garrett & Dunner L.L.P.

(57) ABSTRACT

There is disclosed a method for the preparation of a precipitated calcium carbonate (PCC) for use as a pigment in paper coating compositions, the method comprising the steps of (a) carbonating an aqueous lime-containing medium to produce an aqueous suspension of a PCC predominantly in a selected crystal form, (b) at least partially dewatering the PCC-containing suspension; and (c) subjecting the PCC-containing suspension to comminution by high shear attrition grinding with an attrition grinding medium. Steps (b) and (c) may be applied in either order, ie. (b) followed by (c) or alternatively (c) followed by (b). The dewatering step (b) is preferably carried out using a pressure filter device operating at a pressure of at least 5 MPa, preferably at least 10 MPa. A pH reduction step may be applied after steps (b) and (c). Also disclosed are pigments produced by the method and pigment and paper coating compositions including such pigments.

39 Claims, No Drawings

PAPER COATING PIGMENTS, THEIR PRODUCTION AND USE

Matter enclosed in heavy brackets [ ] appears in the original patent but forms no part of this reissue specification; matter printed in italics indicates the additions made by reissue.

*We claim priority to GB 9,520,703 issued Oct. 10, 1995.*

The present invention relates to paper coating pigments and their production and use.

In particular, the invention concerns an improved precipitated calcium carbonate product for use as a paper coating pigment, a process for preparing the same and paper coating compositions containing such pigment.

Coated paper and coated paperboard is used for a large range of products including packaging, art paper, brochures, magazines, catalogues and leaflets. Such coated paper and paperboard is required to give a range of properties, including brightness, opacity and sheet gloss, as well as printing performance.

In an effort to attain the required properties, many paper makers use small proportions of calcined clay and/or titanium dioxide ($TiO_2$) in their coating formulations. Such additives have the advantage that they strongly scatter light, and thus give good opacity and brightness, but their drawback is their relatively high cost.

The general principle of using a precipitated calcium carbonate (PCC) to replace partly or wholly such expensive additives has been recognised before [J. N. Ishley, E. J. Osterhuber & N. Roman, 1992 TAPPI Coating Conference Proceedings, 335–348 (1992)].

Calcium carbonate can be precipitated from aqueous solution in three different principal crystal forms: the vaterite form which is thermodynamically unstable, the calcite form which is the most stable and the most abundant in nature, and the aragonite form which is metastable under normal ambient conditions of temperature and pressure, but converts to calcite at elevated temperatures.

The aragonite form crystallises as long, thin needles having a length:diameter ratio of about 10:1, but the calcite form exists in several different shapes of which the most commonly found are the rhombohedral shape in which the length and diameter of the crystals are approximately equal, and the crystals may be either aggregated or unaggregated; and the scalenohedral shape in which the crystals are like double, two-pointed pyramids having a length:diameter ratio of about 4:1, and which are generally aggregated. All these forms of calcium carbonate can be prepared by carbonation of milk of lime by suitable variation of the process conditions.

The work of Ishley et al. reported in the reference specified above refers to the use of rhombohedral calcitic PCC. The use of aragonitic PCC in paper coating has also been reported [D. B. Crawshaw, C. H. Kahn-Schneider & P. C. Clark, 1982 TAPPI Coating Conference Proceedings, 143–164 (1982); and G. Engstrom & M. Rigdahl, Nordic Pulp and Paper Research Journal, 90–101 (1992)], although this work does not refer specifically to light scattering performance.

One of the problems with aragonitic PCC, produced by the reaction of carbon dioxide with slaked lime, is that the reaction product consists of aggregates of needle shaped particles. The aggregated structure results in poor [Theological] *rheological* behaviour and poor paper coating performance (e.g. sheet and print gloss). A similar but less pronounced problem can occur with scalenohedral PCC.

According to the present invention in a first aspect there is provided a method for the preparation of a precipitated calcium carbonate (PCC) for use as a pigment in paper coating compositions, the method comprising the steps of (a) carbonating an aqueous lime-containing medium to produce an aqueous suspension of a PCC predominantly in a selected crystal form, (b) at least partially dewatering the PCC-containing suspension; and (c) subjecting the PCC-containing suspension to comminution by high shear attrition grinding with an attrition grinding medium.

Steps (b) and (c) may be applied in either order, ie. (b) followed by (c) or alternatively (c) followed by (b). Where step (b) is applied before step (c) a dispersing agent (as described below) is likely to be required prior to application of step (c).

The dewatering step (b) is preferably carried out using a pressure filter device operating at a pressure of at least 5 MPa, preferably at least 10 MPa. Such a device may conveniently be of the known tube press type wherein a material is pressure filtered between two co-axially disposed tubular bodies. Such devices are described for example in GB 907,485 and in GB 1,240,465. In GB 907,485 for example, the tube pressure filter essentially comprises an upright annular chamber formed between two co-axially disposed tubular bodies, which chamber is divided into inner and outer non-intercommunicating compartments by an impermeable elastic sleeve, the arrangement being such that, in use, a material to be pressure filtered is introduced into the compartment formed between one side of the elastic sleeve and one of the tubular bodies, the one tubular body supporting a filter element, and a hydraulic fluid is introduced into the compartment formed between the other side of the elastic sleeve and the other tubular body so as to compress the material to be pressure filtered against the filter element.

The comminution step (c) is preferably carried out such as to dissipate in the suspension in which the PCC is formed at least 100 kilowatt hours of energy per dry tonne of PCC. The dissipated energy may be [200 kwhr] *200 kWhr* or more per tonne.

The grinding medium employed in step (c) may comprise one of the hard, inorganic materials well known in the grinding of particulate materials. For example, silica sand having a median particle diameter in the range from about 0.1 mm to 4 mm, eg. 0.2 mm to 2 mm, is a preferred grinding medium. The grinding medium could alternatively be aluminium oxide, zirconium oxide, hard steel or a mixture of any of these materials.

Preferably, step (a) is carried out in an known manner by carbonating a lime containing aqueous medium. Carbonation is desirably carried out using a carbon dioxide containing gas.

We have found unexpectedly that by use of the method according to the first aspect of the present invention PCC products can be formed which have improved optical properties when compared with those prepared in the conventional manner. Such products are therefore especially suitable for producing paper coatings with improved performance. Examples of such improvements are given hereinafter.

Particles obtained in a PCC produced as in step (a) in the method according to the first aspect of the present invention will comprise aggregates as described hereinbefore. We have found unexpectedly that substantial breaking down of such aggregates occurs in both steps (b) and (c) in the method according to the first aspect of the present invention. The contribution to breakdown of the aggregates by step (b) is greater when step (b) precedes step (c) and this is one of the factors which may lead an operator to choose to apply step (b) before step (c).

We have found that when the particle aggregates are broken down in steps (b) and (c) the pH of the aqueous suspension being treated rises. We believe that the reason for this is that when PCC is formed as in step (a) unconverted lime becomes entrapped in the PCC crystal aggregates. When the aggregates are broken down this free lime is released and dissolves in the host aqueous medium. The PCC produced as in the prior art or in step (a) may for example contain by weight up to 5% free lime, eg. 0.2% to 2% free lime. The pH may rise to pH11 or more after the application of the first of step (b) and step (c). Such a pH level is undesirable in the paper coating applications in which the PCC may be employed, as described hereinafter, because it is potentially harmful to machinery and to operators who have to process the suspension.

Desirably, an additional step (d) to reduce the pH of the aqueous PCC-containing suspension is applied preferably after both steps (b) and (c) have been applied although it could be applied after the first of these two steps. The additional step (d) may be applied until the pH falls to a suitable level, eg. below pH 9 preferably to or below pH 7.5. The additional step (d) may comprise further carbonation of the PCC-containing suspension. Alternatively, or in addition, a material known for use in a reducing the pH of a mineral suspension may be added. Such a material may, for example, comprise a mild mineral acid such as phosphoric acid.

In the method according to the first aspect of the present invention the aqueous suspension formed in step (a) may have a (dry weight) solids concentration of from 10% to 25%. After application of step (c) the PCC-containing suspension may have a solids concentration by weight of at least 50%, eg. greater than 65%.

Desirably, the suspension formed after step (c) is suitable for use in the formation of a paper coating composition without further dewatering.

For example, we have found that for a given predominantly aragonitic PCC produced in a manner to give a solids level of approximately 18% by weight, the properties given in Table 1 as follows can be obtained by a method embodying the first aspect of the present invention wherein step (b) follows step (a) and step (c) follows step (b).

TABLE 1

| PCC Product Stage | Particle Size Parameter X1 | Particle Size Parameter X2 | Particle Size Parameter X3 | Particle Size Parameter X4 | Gloss (%) |
|---|---|---|---|---|---|
| Product of Step (a) | 90 | 75 | 10 | <5 | |
| Product of Step (b) | 90 | 75 | 50 | 25 | 55 |
| Product of Step (c) | 98 | 93 | 67 | 32 | 59 |

In the method employed to obtain the PCC product whose properties are shown in Table 1 step (b) was carried out using a tube press providing a pressure of >7 MPa and step (c) was carried out using silica sand grinding using a grinding energy expenditure of 100 kwhr per dry tonne of product.

In Table 1, the particle size parameters X1 to X4 are the percentages by weight of particles in the product at the given product stage having an esd less than respectively 2 μm, 1 μm, 0.5 μm and 0.25 μm.

Thus, it can be seen from Table 1 that the combination of steps (b) and (c) applied after step (a) unexpectedly and beneficially improves the particle size distribution of the particles of the PCC product and this provides a consequential improvement in optical properties.

A dispersing agent, e.g. one of the agents specified below, may be employed during the grinding step (c). This may conveniently be applied before step (c) is begun.

The product of step (b) or step (c) (or step (d) if employed), may be formed into a dispersed aqueous suspension, by adding a dispersing agent for the PCC, e.g. in an amount of from 0.01% to 2%, e.g. 0.02% to 1%, by weight based on the dry weight of the pigment, the suspension containing at least 60%, preferably at least 70%, by weight of dry calcium carbonate and having a viscosity of not more than 500 mPa·s as measured by means of a Brookfield Viscometer at a spindle speed of 100 rpm. This dispersed suspension may then be incorporated into a paper coating composition together with an adhesive. The adhesive may be one of the adhesives known in the art and may form from 4% to 30%, eg. less than 20% by weight, of the composition, based on the dry weight of the calcium carbonate. For example the adhesive for the pigment may generally be chosen from the known materials for use in paper coating compositions, eg. the group consisting of starches, proteinaceous adhesives such as casein, and latices of, for example, styrene butadiene rubber and acrylic polymers.

According to a second aspect of the present invention there is provided, therefore, a pigment for paper coating which comprises a PCC produced by the method of the first aspect.

A preferred form of PCC which may be the PCC according to the second aspect of the present invention has a particle size distribution such that at least 70 percent by weight and desirably at least 90 percent by weight of the PCC particles have an equivalent spherical diameter (as measured by sedimentation) of less than *1* micrometer. Desirably, at least 50% by weight (based on the dry PCC weight) have an equivalent spherical diameter of less than 0.5 micrometers. A preferred product particle size distribution for the preferred PCC is one in which the particle size distribution is such that the percentage by weight of particles [have] *having* an equivalent spherical diameter (measured by sedimentation) smaller than 1 μm, 0.5 μm and 0.25 μm, respectively is as follows:

96 to 99 wt %<1 μm 50 to 80 wt %<0.5 μm 10 to 45 wt %<0.25 μm.

Such a distribution has not been achieved for PCC products in the prior art. The usefulness of such a distribution is demonstrated hereinafter.

The selected crystal form of the PCC according to the second aspect is preferably a form which is predominantly aragonite although a form which is predominantly calcite of the scalenohedral habit or shape is also acceptable. Desirably, the length to diameter ratio of the crystals of the selected form averages at least 3:1. The process conditions during the precipitation process required generally to achieve either principally aragonitic or scalenohedral PCC are known to those skilled in the art.

A preferred form of a method according to the first aspect to produce predominantly an aragonitic PCC comprises the following steps prior to steps (b) and (c) as described above:

(i) mixing quicklime with water at a temperature not exceeding 60 C. to give an aqueous suspension containing from 0.5 to 3.0 moles of calcium hydroxide per liter of suspension under conditions such that the temperature of the suspension increases by not more than 80 Celsius degrees;

(ii) cooling the suspension of slaked lime prepared in step (a) to a temperature in the range from 30 C. to 50 C.

(iii) passing a carbon dioxide-containing gas through the cooled suspension at a rate such that not more than 0.02 moles of carbon dioxide are supplied per minute per mole of calcium hydroxide to precipitate calcium carbonate in the suspension while the temperature thereof is maintained within the range from 30 C. to 50 C. until the pH has fallen to a value within the range from 7.0 to 7.5.

The PCC form achieved in practice is unlikely to be 100% of the selected form. It is quite usual for one PCC crystal form even when predominant to be mixed with other forms. Such mixed forms will give suitably improved product properties. We prefer that at least 50% by weight, desirably at least 80% by weight of the crystals in the PCC product produced in step (a) are of the selected form.

As noted above, the PCC product of the second aspect may be dispersed in an aqueous medium using a dispersing agent to form a dispersed aqueous suspension of the PCC. According to the present invention in a third aspect, therefore, there is provided a dispersed aqueous suspension of the PCC product of the second aspect which incorporates a dispersing agent. The dispersed aqueous suspension formed preferably contains at least 60% preferably at least 70% by weight of calcium carbonate based on the dry weight of calcium carbonate present and has a viscosity of not more than 500 mPa·s as measured by a Brookfield Viscometer at a spindle speed of 100 revolutions per minute. The dispersing agent may be present in an amount of from 0.01 percent to 2.0 percent, e.g. 0.02 percent to 1.5 percent by weight based upon the dry weight of PCC present.

The dispersing agent may be selected from the dispersing agents known in the art for the dispersion of calcium carbonate. The dispersing agent may, for example, comprise a polycarboxylate which may be a homopolymer or copolymer which contains a monomer unit comprising a vinyl or olefinic group which is substituted with at least one carboxylic acid group, or a water soluble salt thereof. Examples of suitable monomers are acrylic acid, methacrylic acid, itaconic acid, crotonic acid, fumaric acid, maleic acid, maleic anhydride, isocrotonic acid, undecylenic [acic] *acid*, angelic acid and hydroxyacrylic acid. The number average molecular weight of the polycarboxylate dispersing agent should be not greater that 20,000, and preferably in the range from 700 to 10,000, as measured by the method of gel permeation chromatography using a low angle laser light scattering detector.

According to the present invention in a fourth aspect there is provided a pigment composition for use in paper coating which comprises a mixture of pigments one of which comprises a PCC according to the second aspect or a dispersed aqueous suspension according to the third aspect. The said PCC may comprise predominantly an aragonitic PCC or predominantly a scalenohedral PCC, the PCC having a particle size distribution such that at least 70 percent of the particles have an equivalent spherical diameter of less than 1 micrometer and at least 50 percent of the particles have an equivalent spherical diameter of less than 0.5 micrometers.

The other pigment or pigments incorporated in the mixture according to the fourth aspect may for example be selected from titanium dioxide, calcined clay, talc, calcium sulphate, kaolin clay, calcined kaolin and precipitated or ground calcium carbonate. The pigment mixture desirably includes a mixture of the product of the second aspect and a kaolin clay. Such a pigment mixture may comprise from 5 percent to 99 percent, especially 40 percent to 70 percent, by weight of the PCC product. Platey kaolin clay is especially preferred to form the pigment mixture with the PCC product optionally together with other pigment ingredients for the reasons explained hereinafter. By "platey" kaolin clay is meant a kaolin clay having an aspect ratio of at least 20:1, preferably at least 30:1.

The pigment mixture may be formed by mixing aqueous suspensions of each of the required pigments to form an aqueous suspension incorporating the mixture of pigments. Such an aqueous suspension may be a dispersed aqueous suspension and the individual aqueous suspension of pigments employed to form the mixture may each incorporate a dispersing agent. The dispersing agents employed to disperse the pigments in the individual aqueous suspensions mixed together, and the concentrations of such suspensions, may be the same or different.

According to the present invention in a fifth aspect there is provided a paper coating composition which comprises an aqueous suspension of a PCC product according to the second aspect mixed together with an adhesive. The PCC product employed in the composition may be mixed with one or more pigments as described above. The adhesive may form from 4 percent to 30 percent by weight based on the total dry weight of pigment or pigments present. The adhesive may be one of the known paper coating adhesives employed in the art, e.g. chosen from the group consisting of starches, proteinaceous adhesives such as casein and latices of, for example, styrene butadiene rubbers and acrylic polymers.

The paper coating composition according to the fifth aspect may also include one or more optional additives conventionally used in paper coating compositions, eg. a thickener, e.g. in an amount of up to two percent by weight based upon the total dry weight of pigment or pigments present. The thickener may comprise one or more substances employed as thickeners in the prior art, e.g. sodium carboxymethyl cellulose or synthetic acrylic thickeners.

The paper coating composition according to the fifth aspect may be formed by mixing together an aqueous dispersed suspension according to the third aspect, optionally with one or more further aqueous dispersed suspensions containing other pigments, with the adhesive and any other optional constituents e.g. thickener, in a manner familiar to those skilled in the art.

We have found that paper coating compositions according to the fifth aspect when applied to woodfree paper or board, especially as a topcoat on a precoated base substrate, gives excellent sheet gloss, print gloss and brightness. The performance of the material when coated onto a wood containing base, especially in a light weight coating, has been surprisingly good in two respects:

(i) The sheet opacity and brightness attained have been such that, in a paper coating composition comprising a mixture of white pigments comprising 85 parts by weight kaolin, 10 parts by weight metakaolin (calcined kaolin), and 5 parts by weight $TiO_2$, up to 10 parts of calcined kaolin plus 5 parts of $TiO_2$ and 25 parts of kaolin can be replaced with 40 parts of the dry PCC product according to the second aspect with no deleterious effect on sheet properties.

(ii) Even more surprisingly, it has been found that a blend of material embodying the fifth aspect with a "platey" kaolin clay, i.e. a kaolin clay of high particle aspect ratio (ratio of diameter of a circular platelet of equivalent area to average platelet thickness) of at least 20, can, in some cases, give a superior gloss to either pigment alone, and the sheet brightness attained with the blend is markedly greater than would be expected by interpolating from the brightnesses of the sole pigments.

Embodiments of the present invention will now be described by way of example only with reference to the following Examples.

EXAMPLE 1

Predominantly aragonitic PCC for use as a paper coating pigment as prepared by the following method embodying the present invention.

A sample of quick lime was slaked in water at a temperature of 47 C. to give a 2 molar suspension of hydrated lime, i.e. 148 g of $Ca(OH)_2$ per liter of suspension. During this slaking the temperature of the suspension rose to a temperature 72 C. The slaked lime suspension was then cooled to a temperature of 40 C. before carbonating.

25 $m^3$ batches of this suspension were carbonated at a constant temperature of 40 C. Carbon dioxide was applied at a rate of introduction of 0.0026 moles of carbon dioxide per minute per mole of a calcium hydroxide. Carbonation was continued until the pH began to drop, and then for another 30 minutes thereafter, given a final pH of 7.5. This gave a slurry of 18 wt % solids, which was diluted to 16 wt % after rinsings from the carbonator were added At this point the precipitated calcium carbonate typically had a particle size distribution such that 80% by weight of the particles had an equivalent spherical diameter smaller than 2 $\mu$m and 25% by weight of the particles had an equivalent spherical diameter smaller than 1 $\mu$m.

The precipitated calcium carbonate was then comminuted to break up aggregates in an attrition grinding mill fitted with a 250 horsepower (186 kW) motor and containing as the grinding medium silica sand consisting of grains having sizes in the range from 0.5 mm to 1.0 mm. Flow and density sensors were coupled to a kilowatt-hour meter to give control of grinding energy. Typically about 100 to 200 kilowatt hours per tonne were needed to attain the desired particle size of about 95% to 100% by weight of the particles having an equivalent spherical diameter smaller than 1 $\mu$m. After grinding, the product was passed through a 370 mesh (nominal aperture 40 $\mu$m) screen.

The suspension of ground precipitated calcium carbonate was then partially dewatered in a tube pressure filter of the type described in British Patent Specification No. 1240465. This gave a cake solids of about 71 wt % to 72 wt %.

The pH of the suspension was adjusted in one of the ways described above to pH7.5.

In preparation for paper coating experiments, partially dewatered calcium carbonate prepared in the method embodiment described above was redispersed in water containing 0.8 wt % of a sodium polyacrylate dispersing agent in a high shear mixer, to give a fluid suspension containing about 70% to 71% by weight of dry calcium carbonate, and having a viscosity as measured by means of a Brookfield Viscometer at a spindle speed of 100 r.p.m. of about 200 mPas.

EXAMPLE 2

Five paper coating compositions were prepared according to the recipes set out in Table 2 below:

TABLE 2

| Ingredient | Composition A | B | C | D | E |
|---|---|---|---|---|---|
| | % by weight | | | | |
| Clay 1 | 85 | 90 | 60 | 60 | 60 |
| Calcined Clay | 10 | 10 | — | — | — |
| Titanium dioxide | 5 | — | — | — | — |
| PCC 1 | — | — | 40 | — | — |
| PCC 2 | — | — | — | 40 | — |
| PCC 3 | — | — | — | — | 40 |
| Styrene-butadiene latex adhesive | 8 | 8 | 8 | 8 | 8 |
| Corn Starch adhesive | 8 | 8 | 8 | 8 | 8 |
| Sodium hydroxide to give a pH of: | 8.5 | 8.5 | n.a | n.a | n.a |
| Water to give a solids concentration of: (% by weight) | 56.0 | 56.5 | 57.5 | 56.8 | 57.3 |

Note: In this Table, and in subsequent Tables, "n.a." means "not applicable". In these cases no sodium hydroxide was added.

Clay 1 was a fine hydrous kaolin such that 95% by weight consisted of particles having an equivalent spherical diameter (e.s.d.) of less than 2 $\mu$m and 89% by weight consisted of particles having an e.s.d. of less than 1 $\mu$m.

The calcined clay was metakaolin such that 91% by weight consisted of particles having an e.s.d. of less than 2 $\mu$m.

The titanium dioxide was of the rutile type and was marketed by Du Pont de Nemours Int.S.A. under the registered trade mark "TI-PURE".

PCC 1 was of the predominantly aragonitic type (prepared as in Example 1) and was ground such that 96% by weight consisted of particles having an e.s.d. of less than 1 $\mu$m. Its powder brightness, or percentage reflectance to light of 457 nm wavelength, was 94.3.

PCC 2 was of the predominantly aragonitic type (prepared as in Example 1) and was ground such that 75% by weight consisted of particles having an e.s.d. of less than 1 $\mu$m.

PCC 3 was of the predominantly aragonitic type (prepared as in Example 1) and was ground such that 93% by weight consisted of particles having an e.s.d. of less than 1 $\mu$m.

Each of PCC 1, PCC 2 and PCC 3 had at least 50 percent of particles having an esd less than 0.5 $\mu$m. The differentiation in particle size between PCC1, PCC2 and PCC3 was achieved by controlling the work input during the attrition grinding step employed in production. It should be noted that in compositions C, D and E no sodium hydroxide to give pH adjustment was required at the composition forming stage.

Each of the coating compositions A to E was formed in a known way by mixing together dispersed aqueous suspensions of the relevant pigments together with the other ingredients incorporated into the composition. The suspensions of pigment comprising clay, calcined clay or $TiO_2$ each contained 0.3 percent or less of a sodium polyacrylate dispersing agent. The dispersed suspension of PCC was produced by the above method embodiment.

Compositions A to E were each separately applied to a 39 gsm LWC (light weight coated) offset basepaper, using a Valmet pilot coater with a short dwell head at a coating speed of 1200 m/min and with a blade holder angle of 45. Coat weights of approximately 6, 8 and 10 gsm were obtained by adjusting the pressure applied to the blade.

Samples of the papers so coated with compositions A to E were conditioned for 24 hours at 23 C., 50% relative humidity, and were calendered by passing them 6 times through a Perkins laboratory supercalender at a temperature of 65 C., a pressure of 45 bar and a speed of 36 m/min.

The papers so calendered were then subjected to the paper and offset printing tests described below.

The results from these tests are given in Table 3 below, interpolated to a coat weight of 8 gsm (the exceptions to this are the printing results which are obtained from measurements at one coat weight, at or very close to 8 gsm).

TABLE 3

| Composition | Gloss % | Brightness (ISO) | Opacity (ISO) | Dry Print Gloss | Dry Print Density |
|---|---|---|---|---|---|
| A (reference) | 57 | 72.7 | 91.2 | 67 | 1.48 |
| B (reference) | 56 | 71.3 | 90.0 | 69 | 1.45 |
| C (invention) | 59 | 72.9 | 91.1 | 65 | 1.46 |
| D (invention) | 53 | 72.8 | 90.7 | 61 | 1.43 |
| E (invention) | 56 | 72.9 | 90.9 | 64 | 1.45 |

It can be seen that with Compositions C and E, which contain the finer PCC samples, but no calcined clay or titanium dioxide, the sheet gloss of the reference Compositions can be matched or exceeded. With Compositions C, D and E, the sheet brightness and opacity of reference Composition B (with 10 parts of calcined clay) is exceeded. The brightness and opacity of reference Composition A, with 10 parts calcined clay and 5 parts $TiO_2$, is matched by Composition C (with the finest PCC sample) and is approached by Compositions D and E.

EXAMPLE 3

Three coating Compositions F, G and H were prepared according to the recipes given in Table 4 below in the manner described with reference to Example 2:

TABLE 4

| Ingredient | Composition F | G | H |
|---|---|---|---|
| | % by weight | | |
| Clay 2 | 100 | 90 | 50 |
| Calcinated clay | — | 10 | — |
| PCC 1 | — | — | 50 |
| Styrene-butadiene latex adhesive | 12 | 12 | 12 |
| Carboxy methyl cellulose thickener | 0.5 | 0.5 | 0.5 |
| Sodium hydroxide to give a pH of: | 8.5 | 8.5 | n.a. |
| Water to give a solids concentration of: (% by weight) | 58.0 | 56.3 | 60.3 |

Clay 2 was a moderately platey paper coating kaolin clay (average aspect ratio about 30) having a particle size distribution such that 85% by weight consisted of particles having an e.s.d. smaller than 2 $\mu$m.

The calcined clay was as used in Example 1.

Compositions F, G and H were separately applied to a 39 gsm LWC offset basepaper using a Valmet pilot coater with a short dwell head with a coating speed of 1200 m/min, using a blade holder angle of 45 degrees. Coat weights of between 5 and 10 gsm were obtained by adjusting the pressure applied to the blade. Samples of the papers so coated with Compositions F to H were conditioned for 24 hours at a temperature of 23 C. and 50% relative humidity, and were calendered by passing them 10 times through a Perkins laboratory supercalender at a temperature of 65 C., a pressure of 69 bar and a speed of 36 m/min. The papers so calendered were then subjected to the paper tests described below.

The results from these tests are given in Table 5 below, interpolated to a coal weight of 7 gsm.

TABLE 5

| Composition | Gloss % | Brightness (ISO) | Opacity (ISO) |
|---|---|---|---|
| F (reference) | 56 | 70.3 | 89.5 |
| G (reference) | 58 | 71.3 | 90.0 |
| H (invention) | 61 | 72.8 | 89.8 |

It can be seen that Composition H gives superior gloss to both of the reference Compositions F and G. The brightness is superior and the opacity similar to that given by Composition G, which contains 10 parts by weight of calcined clay.

EXAMPLE 4

Three coating compositions were prepared according to the recipes given in Table 6 below:

TABLE 6

| Ingredient | Composition J | K | L |
|---|---|---|---|
| | % by weight | | |
| Clay 3 | 100 | — | 50 |
| PCC 1 | — | 100 | 50 |
| Styrene-butadiene latex adhesive | 12 | 12 | 12 |
| Carboxy methyl cellulose thickener | 0.5 | 0.5 | 0.5 |
| Sodium hydroxide to give a pH of: | 8.5 | n.a | n.a |
| Water to give a solids concentration of: (% by weight) | 59.8 | 63.4 | 60.3 |

Clay 3 was a kaolin refined such that 94% by weight consisted of particles having an e.s.d. of less than 2 $\mu$m and 85% by weight consisted of particles of e.s.d of less than 1 $\mu$m.

Compositions J, K and L were applied separately to a 39 gsm LWC offset basepaper using a Valmet pilot coater with a short dwell head with a coating speed of 1200 m/min, using a blade holder angle of 45 degrees. Coat weights of between 5 and 11 gsm were obtained by adjusting the pressure applied to the blade. The papers so coated with Compositions J, K and L were conditioned for 24 hours at a temperature of 23 C., 50% relative humidity, and were calendered using a Perkins laboratory supercalender under the same conditions as those employed in Example 2. The papers so calendered were then subjected to the paper tests described below.

The results from these tests are given in Table 7 below, interpolated to a coat weight of 8 gsm.

TABLE 7

| Composition | Gloss % | Brightness (ISO) | Opacity (ISO) |
|---|---|---|---|
| J (reference) | 61 | 69.9 | 89.6 |
| K (invention) | 62 | 74.3 | 89.6 |
| L (invention) | 64 | 73.2 | 89.9 |

It can be seen that:

(i) Composition K and L both showed superior gloss and brightness compared with reference Composition J;

(ii) Composition L (incorporating a blend of pigments) gives slightly superior gloss to that of either of the sole pigments (compositions J and K);

(iii) Composition L has a brightness over a unit higher than that which would be expected by interpolating from the brightnesses given by the sole pigments.

EXAMPLE 5

Four coating compositions were prepared according to the recipes given in Table 8 below in the manner described with reference to Example 2 above.

TABLE 8

| Ingredient | Composition M | N | P | Q |
|---|---|---|---|---|
| | % by weight | | | |
| Clay 3 | 30 | 30 | — | — |
| Clay 4 | — | — | 50 | 50 |
| PCC 1 | — | 70 | — | 50 |
| [PCC 1]*GCC 1* | 70 | — | 50 | — |
| Styrene-butadiene latex adhesive | 11 | 11 | 12 | 12 |
| Carboxy methyl cellulose thickener | 0.5 | 0.5 | 0.5 | 0.5 |
| Sodium hydroxide to give a pH of: | 8.5 | n.a. | 8.5 | n.a. |
| Water to give a solids concentration of: (% by weight) | 66.3 | 63.7 | 63.1 | 61.7 |

Clay 3 was a kaolin refined such that 94% by weight consisted of particles having an e.s.d. of less than 2 μm and 85% by weight consisted of particles of e.s.d. of less than 1 μm.

GCC 1 was a ground marble with a powder brightness of 94.5 and a particle size distribution such that 95% by weight consisted of particles having an e.s.d. of less than 2 μm.

Clay 4 was a kaolin having a particle size distribution such that 91% by weight consisted of particles having an e.s.d. of less than 2 μm and 81% by weight consisted of particles having an e.s.d. of less than 1 μm.

Compositions M and N were separately applied to a 81 gsm precoated woodfree basepaper with a ISO sheet brightness of 92.0 using a Valmet pilot coater with a Roll Applicator with a coating speed of 800 m/min and blade holder angles of 47 and 48 degrees respectively. Coat wights of 10, 12 and 14 gsm were obtained by adjusting pressure applied to the blade. The papers so coated with compositions M and N were calendered by passing them 11 times through a Valmet Supercalender at a temperature of 100 C, a pressure of 300 kN/m$^2$ and a speed of 800 m/min.

Compositions P and Q were separately applied to a 39 gsm LWC wood containing basepaper with an ISO sheet brightness of 67.5 using a Valmet pilot coater with a short dwell head, with a coating speed of 1200 m/min and a blade holder angle of 45 degrees. Coat weights of 6, 8 and 10 gsm were obtained by adjusting the displacement of the blade towards the paper surface. The papers so coated with compositions M and Q were conditioned for 24 hours at a temperature of 23 C., 50% relative humidity, and were calendered using a Perkins laboratory supercalender under the same conditions as were employed in Example 3.

The calendered papers coated with compositions M,N,P and Q were subjected to the paper tests described in Example 2. The results are shown in Table 9 below.

TABLE 9

| Composition | Gloss % | Brightness (ISO) | Opacity (ISO) |
|---|---|---|---|
| | Precoated Woodfree Basepaper | | |
| M | 72 | 88.8 | 89.1 |
| N | 78 | 88.4 | 89.4 |
| | LWC Mechanical Basepaper | | |
| P | 67 | 71.8 | 89.5 |
| Q | 72 | 73.0 | 90.8 |

EXAMPLE 6

Six paper coating compositions were prepared according to the recipes set out in Table 10 below:

TABLE 10

| Ingredient | Composition R | S | T | U | V | W |
|---|---|---|---|---|---|---|
| | % by weight | | | | | |
| GCC 1 | — | 100 | — | 100 | — | 100 |
| GCC 2 | 50 | — | 50 | — | 50 | — |
| PCC 4 | 50 | — | — | — | — | 50 |
| PCC 5 | — | — | 50 | — | — | — |
| PCC 6 | — | — | — | — | 50 | — |
| Styrene-butadiene latex adhesive | 11 | 11 | 11 | 11 | 11 | 11 |
| Carboxy methyl cellulose thickener | 0.5 | 0.5 | 0.5 | 0.5 | 0.5 | 0.5 |
| Water to give a solids concentration of: (% by weight) | 68.5 | 69.1 | 68.7 | 69.3 | 67.2 | 67.3 |

GCC 2 was a ground marble with a powder brightness of 94.5 and a particle size distribution such that 90% by weight consisted of particles having an e.s.d. of less than 2 μm.

PCC 4 was of the aragonitic type produced as in Example 1 and was ground such that 97% by weight consisted of particles having an e.s.d. of less than 1 μm.

PCC 5 was of the predominantly scalenohedral type produced by a method embodying the invention and was ground such that 98% by weight consisted of particles having an e.s.d. of less than 1 μm.

PCC6 was a predominantly scalenohedral PCC produced without the grinding step (c) of the method according to the first aspect, having a particle size distribution such that 74% by weight consisted of particles having an e.s.d. of less than 1 μm.

Compositions R and S were applied separately to a precoated woodfree base paper with a substance of 113 gsm using laboratory coating machine supplied by Denver and a coating speed of 4000 m/min.

Compositions T and U were separately applied under identical conditions to R and S, but in a separate exercise.

The papers so coated were calendered using the same conditions a those described in Example 2 and were subjected to the paper tests described in Table 10.

The results of these tests interpolated to a coatweight of 10 gsm are also given in Table 11 below.

TABLE 11

| Composition | Gloss % | Brightness (ISO) | Opacity (ISO) |
|---|---|---|---|
| R (Invention) | 80 | 85.0 | 94.2 |
| S (Reference) | 77 | 84.7 | 94.3 |
| T (Invention) | 81 | 87.8 | 91.5 |
| U (Reference) | 77 | 87.8 | 91.4 |
| V (Reference) | 72 | 85.6 | 94.4 |
| W (Reference) | 75 | 85.2 | 94.3 |

It can be seen that, i) Compositions R and T both show superior gloss to the reference compositions S,U,V and W.

ii) Compositions R and T are similar with respect to their performance relative to their respective references S and U, iii) Compositions R and T both give superior gloss to Composition V which contains a precipitated calcium carbonate which was not prepared in accordance with the first aspect of the present invention.

EXAMPLE 7

Four paper coating compositions were prepared according to the recipes set out in Table 12 below:

TABLE 12

| Ingredient | Composition X | Y | Z |
|---|---|---|---|
| | % by weight | | |
| GCC 1 | 70 | | |
| GCC 2 | | 35 | 35 |
| Clay 5 | 30 | 30 | 30 |
| PCC 7 | | 35 | |
| PCC 8 | | | 35 |
| Styrene-butadiene latex adhesive | 11 | 11 | 11 |
| Carboxy methyl cellulose thickener | 0.5 | 0.5 | 0.5 |
| Water to give a solids concentration of: (% by weight) | 65.5 | 65.7 | 65.2 |

Clay 5 was a fine hydrous kaolin, refined such that 92% by weight consisted of particles having an e.s.d. of less than 2 $\mu$m and 83% by weight consisted of particles having an e.s.d of less than 1 $\mu$m.

PCC 7 was produced as in Example 1 and was of the predominantly aragonitic type and was ground such that 94% by weight consisted of particles having an e.s.d. of less than 1 $\mu$m.

PCC 8 was produced by a method embodying the invention and was of the predominantly scalenohedral type ground such that 96% by weight consisted of particles having an e.s.d. of less than 1 $\mu$m.

The above compositions were separately applied on to a 95 gsm surface sized precoated woodfree base using a Valmet pilot coater with a Roll Applicator and a coating speed of 1000 m/min. Coat weights of 8, 10 and 12 gsm were obtained by adjusting the pressure applied to the blade. The papers so coated with compositions X,Y and Z were calendered by passing them 11 times through a Valmet Supercalender at a temperature of 25° C., a pressure of 185 kN/m$^2$ and a speed of 400 m/min. The calendered papers were subjected to the test described in Table 13 below. The results of these tests interpolated to a coatweight of 10 gsm are also given in Table 13.

TABLE 13

| Composition | Gloss % | Brightness (ISO) | Opacity (ISO) |
|---|---|---|---|
| X (Reference) | 71 | 87.5 | 93.4 |
| Y (Invention) | 73 | 87.9 | 93.4 |
| Z (Invention) | 75 | 87.9 | 93.5 |

It can be seen that the compositions Y and Z, both give superior gloss and brightness to the reference composition X.

PCCs produced above in a predominantly scalenohedral form were prepared in a known way using conditions known to give the required form. The lime molarity used was about 2M and the temperature was about 25 C. to 30 C. rising during the carbonation reaction of $CO_2$ and $Ca(OH)_2$.

We claim:

1. A method for the preparation of a precipitated calcium carbonate (PCC) for use as a pigment in paper coating compositions, the method comprising the steps of (a) carbonating an aqueous lime-containing medium to produce an aqueous suspension containing a PCC in predominantly scalenohedral, rhombohedral, or aragonite crystal form, (b) at least partially dewatering the PCC-containing suspension; and (c) subjecting the PCC-containing suspension in wet form to comminution by high shear attrition grinding with an attrition grinding [mediums] *medium* wherein the comminution step is carried out such as to dissipate in the aqueous suspension containing the PCC at least 100 kilowatt hours of energy per dry tonne of PCC and wherein the PCC product produced following steps (b) and (c) comprises particles having a particle size distribution such that at least 70% [be] *by* weight of the particles have an equivalent spherical diameter as measured by sedimentation of less than 1 $\mu$m and at least 50% by weight of the particles have an equivalent spherical diameter of less than 0.5 $\mu$m.

2. A method as claimed in claim 1 and wherein the dewatering step (b) is carried out using a pressure filter device operating at a pressure of at least 5 MPa.

3. A method as claimed in claim 2 and wherein the pressure filter device comprises a tube press wherein material is pressure filtered between two co-axially disposed tubular bodies.

4. A method as claimed in claim 1 wherein step (b) precedes step (c) and a dispersing agent for the PCC is added to the aqueous PCC-containing suspension prior to step (c).

5. A method as claimed in claim 1 and wherein the grinding medium employed in step (c) comprises silica sand having a median particle diameter in the range 0.1 mm to 4 mm.

6. A method as claimed in claim 1 and wherein an additional step (d) is applied after steps (b) and (c) to reduce the pH of the PCC-containing suspension.

7. A method as claimed in claim 1 wherein step (c) precedes step (b) and wherein the aqueous suspension formed in step (a) and treated by comminution in step (c) has a solids concentration of from 10% to 25% by weight and wherein the aqueous suspension after application of step (b) has a solids concentration of at least 50% by weight.

8. A pigment for paper coating which comprises a PCC produced by the method claimed in claim 1, *wherein the particle size distribution is such that the amount of particles having an equivalent spherical diameter of less than 0.25 μm ranges from 10% to 45% by weight.*

9. A pigment [as claimed in claim 8] *for paper coating which comprises a PCC produced by the method claimed in claim 1* and wherein the predominate form of the PCC comprises at least 50% by weight aragonitic or scalenohedral crystals.

10. A dispersed aqueous suspension of the pigment claimed in claim [8] *9* and which includes a dispersing agent for the PCC.

11. A pigment composition which comprises a pigment as claimed in claim [8] *9* mixed together with one or more other pigments.

12. A composition as claimed in claim 11 and wherein the PCC is mixed together with a platey kaolin clay.

13. A paper coating composition comprising an aqueous suspension comprising an adhesive and a suspension as claimed in claim 10.

*14. A method as claimed in claim 1 and wherein the PCC produced according to step (a) is in predominantly scalenohedral or aragonite crystal form.*

*15. A method as claimed in claim 14 and wherein the PCC produced according to step (a) is in predominantly aragonite crystal form.*

*16. A method as claimed in claim 14 or 15 and wherein the dewatering step (b) is carried out using a pressure filter device operating at a pressure of at least 5 MPa.*

*17. A method as claimed in claim 16 and wherein the pressure filter device comprises a tube press wherein material is pressure filtered between two co-axially disposed tubular bodies.*

*18. A method as claimed in claim 14 or 15 wherein step (b) precedes step (c) and a dispersing agent for the PCC is added to the aqueous PCC-containing suspension prior to step (c).*

*19. A method as claimed in claim 14 or 15 and wherein the grinding medium employed in step (c) comprises silica sand having a median particle diameter in the range 0.1 mm to 4 mm.*

*20. A method as claimed in claim 14 or 15 and wherein an additional step (d) is applied after steps (b) and (c) to reduce the pH of the PCC-containing suspension.*

*21. A method as claimed in claim 14 or 15 wherein step (c) precedes step (b) and wherein the aqueous suspension formed in step (a) and treated by comminution in step (c) has a solids concentration of at least 50% by weight.*

*22. A pigment for paper coating which comprises a PCC produced by the method claimed in claim 14 or 15.*

*23. A dispersed aqueous suspension of the pigment claimed in claim 22 and which includes a dispersing agent for the PCC.*

*24. A pigment composition which comprises a pigment as claimed in claim 22 mixed together with one or more other pigments.*

*25. A composition as claimed in claim 24 and wherein the PCC is mixed together with a platey kaolin clay.*

*26. A paper coating composition comprising an aqueous suspension comprising an adhesive and a suspension as claimed in claim 23.*

*27. A method for the preparation of a precipitated calcium carbonate (PCC) for use as a pigment in paper coating compositions, the method comprising:*

*carbonating an aqueous lime-containing medium to produce an aqueous suspension containing a PCC in predominately scalenohedral or aragonite crystal form;*

*partially dewatering the PCC-containing suspension; and*

*subjecting the PCC-containing suspension in wet form to comminution by high shear attrition grinding with an attrition grinding medium wherein the comminution is carried out such as to dissipate in the aqueous suspension containing the PCC at least 100 kilowatt hours of energy per dry ton of PCC; and wherein the PCC product produced comprises particles having a particle size distribution such that at least 70% by weight of the particles have an equivalent spherical diameter as measured by sedimentation of less than 1 μm and at least 50% by weight of the particles have an equivalent spherical diameter of less than 0.5 μm.*

*28. A method for the preparation of a precipitated calcium carbonate (PCC) for use as a pigment in paper coating compositions, the method comprising:*

*carbonating an aqueous lime-containing medium to produce an aqueous suspension containing a PCC in predominantly aragonite crystal form;*

*partially dewatering the PCC-containing suspension; and*

*subjecting the PCC-containing suspension in wet form to comminution by high shear attrition grinding with an attrition grinding medium wherein the comminution is carried out such as to dissipate in the aqueous suspension containing the PCC at least 100 kilowatt hours of energy per dry ton of PCC; and wherein the PCC product produced comprises particles having a particle size distribution such that at least 70% by weight of the particles have an equivalent spherical diameter as measured by sedimentation of less than 1 μm and at least 50% by weight of the particles have an equivalent spherical diameter of less than 0.5 μm.*

*29. A method as claimed in claim 27 or 28 and wherein the dewatering is carried out using a pressure filter device operating at a pressure of at least 5 MPa.*

*30. A method as claimed in claim 29 and wherein the pressure filter device comprises a tube press wherein material is pressure filtered between two co-axially disposed tubular bodies.*

*31. A method as claimed in claim 27 or 28 wherein the PCC-containing suspension is dewatered prior to comminution and a dispersing agent for the PCC is added to the aqueous PCC-containing suspension prior to comminution.*

*32. A method as claimed in claim 27 or 28 and wherein the grinding medium employed during comminution comprises silica sand having a median particle diameter in the range 0.1 mm to 4 mm.*

*33. A method as claimed in claim 27 or 28 and wherein the pH of the PCC-containing suspension is reduced after dewatering and comminution.*

*34. A method as claimed in claim 27 or 28 wherein comminution precedes dewatering and wherein the aqueous suspension has a solids concentration of at least 50% by weight after comminution.*

*35. A pigment for paper coating which comprises a PCC produced by the method claimed in claim 27 or 28.*

*36. A dispersed aqueous suspension of the pigment claimed in claim 35 and which includes a dispersing agent for the PCC.*

*37. A pigment composition which comprises a pigment as claimed in claim 35 mixed together with one or more other pigments.*

*38. A composition as claimed in claim 37 and wherein the PCC is mixed together with a platey kaolin clay.*

*39. A paper coating composition comprising an aqueous suspension comprising an adhesive and a suspension as claimed in claim 36.*

* * * * *